Oct. 18, 1927. 1,645,721
P. F. PFEIL
LIGHT PROJECTOR
Filed May 25, 1925 2 Sheets-Sheet 1
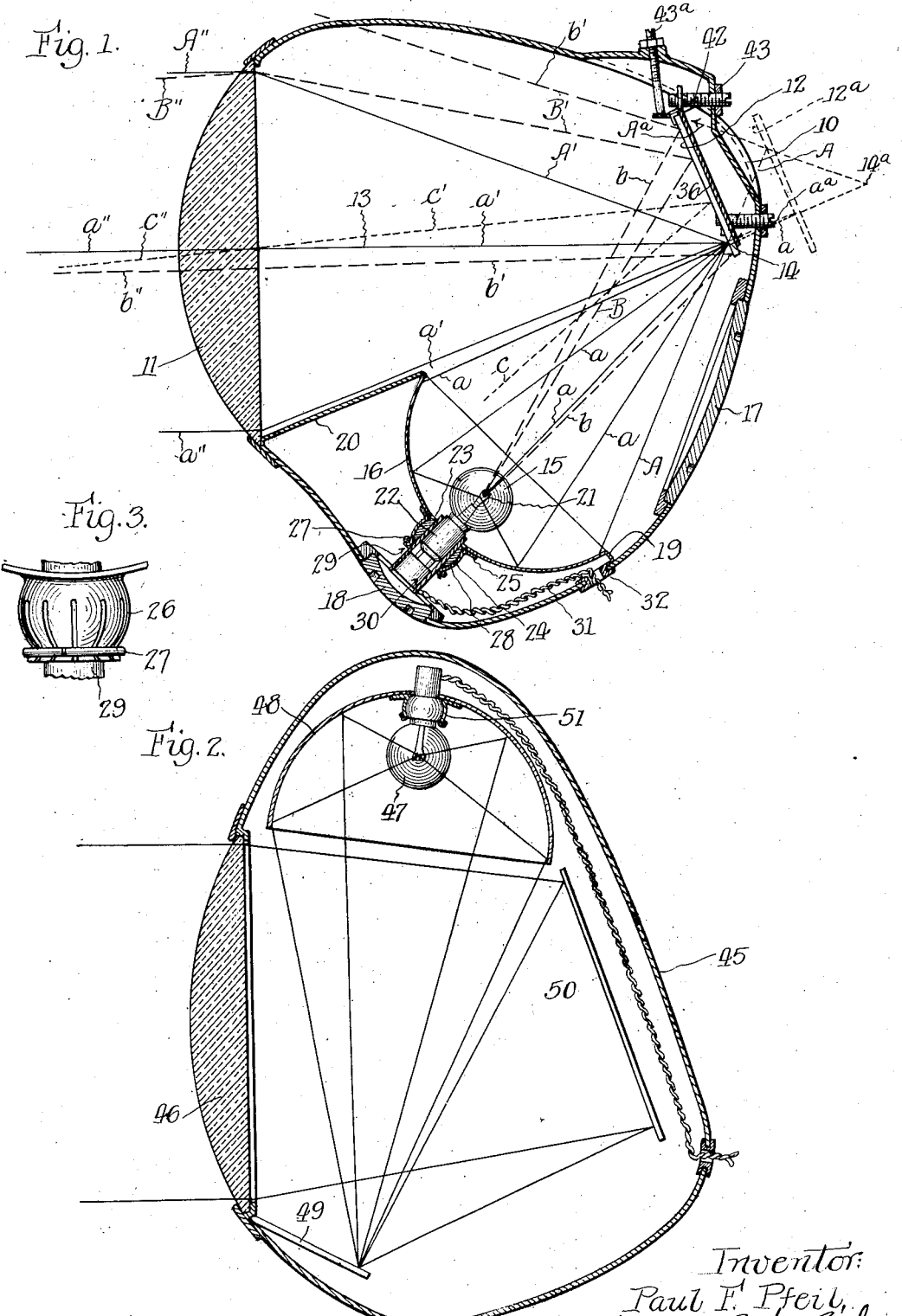
Inventor:
Paul F. Pfeil,
By Churchill Parker Railson
Attys.

Oct. 18, 1927.
P. F. PFEIL
1,645,721
LIGHT PROJECTOR
Filed May 25, 1925
2 Sheets-Sheet 2
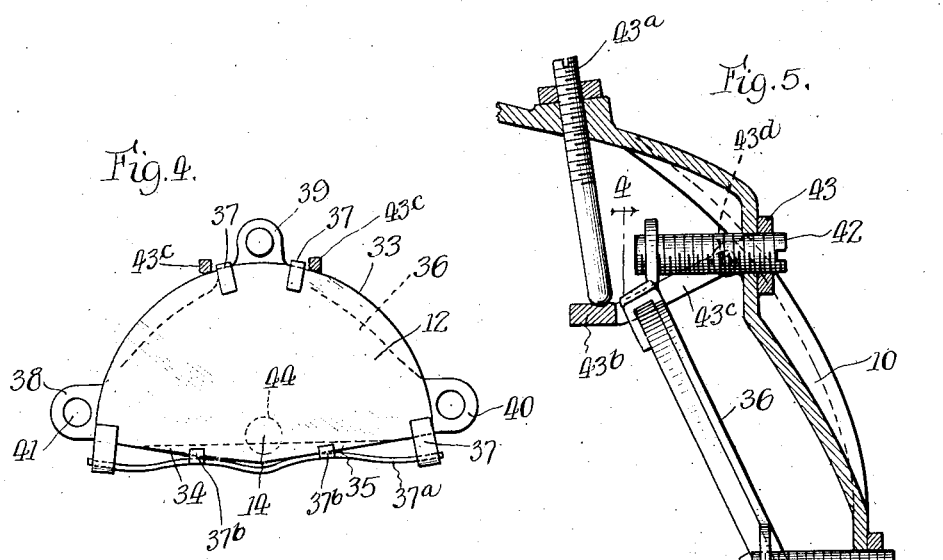
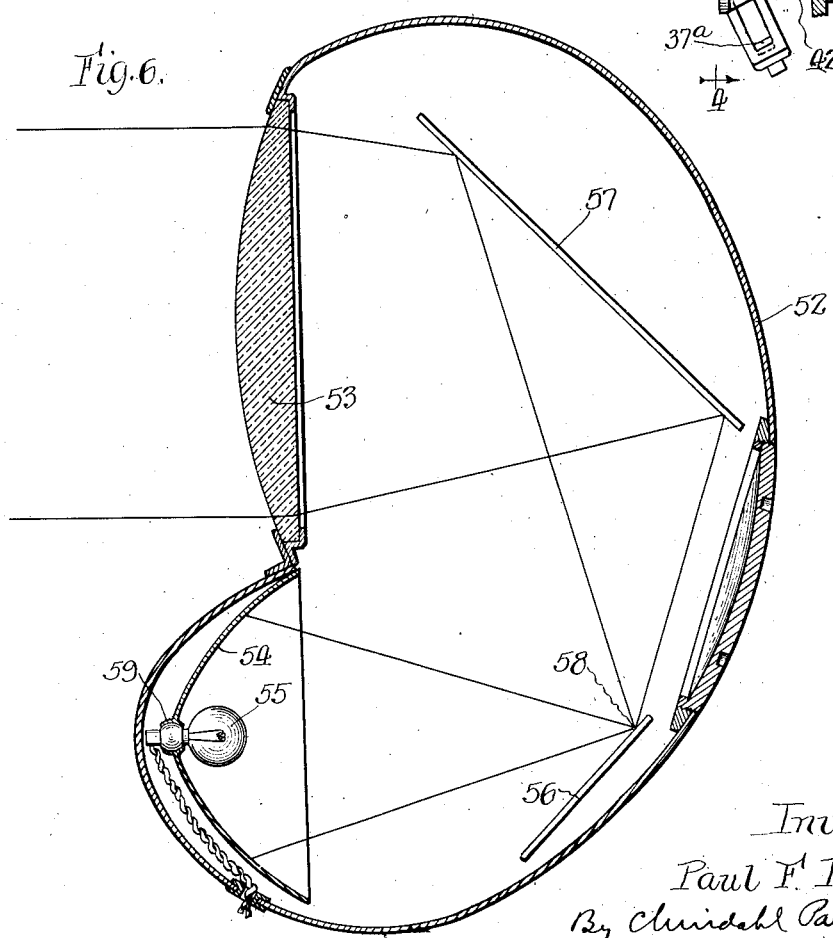
Inventor:
Paul F. Pfeil,
By Chindahl Parker Carlson
Attys.

Patented Oct. 18, 1927.

1,645,721

UNITED STATES PATENT OFFICE.

PAUL FRANCIS PFEIL, OF SOUTH BEND, INDIANA

LIGHT PROJECTOR.

Application filed May 25, 1925. Serial No. 32,562.

This invention relates generally to light projectors and in particular to one useful as an automobile headlight.

Especially in automobile headlights, it is common to provide a light source and beam forming reflector therefor, and likewise to provide in addition mirrors either plane or curved to direct or to both form and direct a beam of light. In such devices not only the primary beam from the reflector, but also the direct rays from the source and the aberrant rays from the reflector are projected from the headlight by the character of the arrangement used. It is a common source of annoyance in such lights that the projected direct rays from the light and the aberrant rays of the first reflector are scattered and diverge from the primary beam into some undesired region, usually upward in the case of automobile headlights. To obviate this difficulty blinds or cut-out means have been used.

In the present invention, I aim to overcome these difficulties by providing a construction for the light projector which serves to separate the primary beams leaving the first reflector from the aberrant rays of the first reflector and from the direct rays from the light source, and further by projecting the primary beam as such, and by selecting such of the aberrant rays as can be readily projected along with the primary beam or into any region not required to be free from light, and by focusing the separated direct rays from the source at a given point in advance of the headlight.

One object of the invention is to project by a suitable means, such as a lens, the image of an illuminated mirror so arranged that the light incident thereon will not be projected into a region desired to be darkened.

Another object is to project the image of a light source to produce the primary beam, rather than to project the light source itself.

Another object is to provide a method whereby all stray rays and aberrations may be separated from the primary beam if desired.

Still another object is to project two images of the light source whereby to project two types of rays.

A further object is to produce an image of the light source substantially at the principal focus of the projecting means and further, to locate the image and said principal focus at the surface of the mirror.

Still another object is to locate the edge of the reflecting mirror in the vicinity of the superimposed principal focus and the image of the source.

A still further object is to place the second image of the source at a distance beyond the principal focus of the lens and to arrange a mirror to form said image so that the projection of said image is limited in one direction.

Still other objects and advantages of the invention will be apparent from the following description of several embodiments of the invention which are particularly adapted as headlights for automobiles and especially designed to prevent the projection of upwardly directed rays.

In the accompanying drawings, I have illustrated the general character of a headlight to be used for automobiles and have shown somewhat in detail the desirable structure and desirable means for effecting adjustment of the various parts of the light.

In the drawings, Fig. 1 represents a cross-section of a headlight showing the paths traversed by the light rays.

Fig. 2 shows a modification of the headlight of Fig. 1, having an additional mirror.

Fig. 3 shows a detailed view of a portion of the universal mounting for the bulb.

Fig. 4 shows a view in elevation of one of the mirrors.

Fig. 5 shows a fragmentary cross-section of a headlight illustrating the adjustable mounting for the mirror of Fig. 4.

Fig. 6 is a second modification of headlight showing two mirrors and a different arrangement of the parts.

In the following description of the headlights shown in the drawing, it is to be understood that these are by no means to be taken as limitations of the invention to the use and to the construction herein illustrated. It will be clear from the following description that the invention is capable of application in a variety of ways and of embodiment in a variety of constructions not herein illustrated, and it is further to be understood that such constructions and arrangements are contemplated by the invention as expressed in the appended claims.

Referring particularly to the drawings, I will first describe in detail the structure of Fig. 1 without reference to the character of the light rays except in a general way as seems necessary. As a suitable enclosure for the light I provide a casing 10 which is preferably dust-proof for use upon automobiles. In the front of the casing, I provide a suitable light projecting means such as the lens 11. In the present instance the lens is plano-convex. At the rear inside wall I provide a reflecting surface preferably as a plane mirror 12 suitably mounted, and preferably adjustably mounted by means later to be described. The mirror 12 is so located that light rays entering the headlight substantially parallel with the principal axis 13 of the lens 11 will be focused on the mirror 12 or in the vicinity of its reflecting surface. Various means may be provided for this purpose. In the present instances, Fig. 1, the mirror 12 is arranged substantially so that the principal axis 13 of the lens intercepts the mirror surface in the vicinity of the principal focus 14 of the lens. But it will be understood that it is not essential that the true principal focus be directly so related to the mirror. In Figs. 2 and 6, it will be observed that the focusing of the rays is accomplished in the same manner but that a mirror is interposed between the lens and its principal focus.

Elsewhere in the casing 10, I provide means to focus rays from a source of light onto the mirror 12 at a point which is substantially near the principal focus 14. Such means is exemplified by a light bulb 15 which serves as a source of light and a surrounding reflector 16 adapted to secure the desired concentration of light from the bulb 15 at a focal point. The casing 10 is provided with removable closures such as the screw plugs 17 and 18 which permit one to have access to the interior for making repairs and adjustments.

Referring in detail to the light source, the reflector 16 is rigidly supported in the casing by the members 19 and 20 securing it to the casing in any suitable manner. The axis of the reflector is alined with the screw closure 18 in the present instance to facilitate adjustment of the bulb 15. Commercial bulbs are not always constructed with their filament 21 lying in the axis of the stem or mounting end 22 of the bulb. For this reason and further for reasons of adjustment, a mounting is provided for the bulb 15 which permits moving the filament 21 into the proper relation with the reflector 16 in order to secure the desired focus onto the mirror 12. Such a mounting demands longitudinal adjustment of the bulb 15 and further provides a universal axial adjustment thereof.

The reflector 16 has a hole 23 therein at the bottom of its cavity. A socket forming collar 24 is provided with a flange 25 which is secured rigidly to the reflector. The collar forms a spherically curved socket, the outer half of the ring of the collar being split forming sections 26 which may be spread to insert a member to be universally mounted therein. A spring ring 27 about the ends of the sections 26 holds them in place to form the socket, and to bring pressure to bear upon the member mounted therein. In the present instance the member mounted universally within this socket comprises a spherically curved annular ring 28. The ring 28 has frictional engagement with a tube section 29, passing through it, in which the bulb stem 22 is mounted. One end of the tube 29 is suitably provided with a construction 30 to secure contact to the bulb, wires 31 therefrom being introduced through a hole 32 in the casing.

The mirror 12, it will be observed, is located with its major portion above the principal axis 13 of the lens 11. Consequently, the image of the mirror can be projected downwardly from the lens. The illumination of the mirror is not confined to the focus point of the reflector 16, it being obvious that the lamp 15 itself directly illuminates the mirror surface, and that aberrations from the reflector 16 also illuminate the mirror. For this reason the mirror is placed with its lower edge near the principal axis of the lens. Otherwise rays incident thereon below the principal axis of the mirror would normally be projected upwardly by the lens 11 which is undesirable. In Fig. 4 I show the preferred shape of the mirror 12, it being arcuate at the top edge preferably to conform to the curvature of the casing and widely V-shaped at the bottom, the V being composed of two upwardly inclined edges 34 and 35 almost in a straight line. The angles of the edges 34 and 35 are preferably so arranged that they will not become downwardly inclined as the automobile tilts slightly on the roadside or upon the side of a crowned road. It is understood, of course, that this refers only to normal driving conditions. The mirror is suitably supported as by a plate 36 at its rear side, clutching fingers 37 being bent over from the plate for this purpose. The fingers 37 serve as guiding fingers in conjunction with the plate 36 and they are so arranged that the mirror is movable between the upper and lower sets of fingers. The fingers are preferably resilient to hold the mirror tightly in position against the plate 36. Between the lower fingers 37 and the lower edges 34 and 35 of the mirror, there is placed a leaf spring 37ª having projections 37ᵇ encompassing the sides of the mirror adjacent the edges thereof. The ends of the spring act upon the bottom of the U-shaped recess formed by the lower bent fingers 37. This construction forces the mirror toward the uppermost position relative to the holding plate 36. The plate 36 has ears preferably three—38, 39 and 40—which are arranged for adjustably mounting the mirror to the casing 10. For this purpose the ears have threaded holes 41 for screws 42 mounted in the rear of the casing. The screws 42 are oppositely threaded in the ears and in the casing so that each screw must be completely screwed out of the casing before it is screwed out of the ear of plate 36. Lock nuts 43 are provided for each screw. Because of the ability of the mirror to move laterally, a vertical adjustment slidably related to the mirror is provided. This consists of a substantially vertical screw 43$^a$ acting upon a flat wide end 43$^b$ of a yoke member which has side arms 43$^c$. The side arms bear upon the top edge of the mirror substantially at right angles to the plane thereof, and the ends of the arms 43$^c$ are pivoted into the casing 10 as indicated at 43$^d$. The arrangement herein described for adjusting the mirror permits of moving the mirror universally into a variety of positions. It may be moved forward and backward by turning all screws 42 an equal amount or it may be inclined in the vertical plane by moving the top screw 42 only or inclined laterally by other adjustments of the screws as may be desired in a special case. Vertical shifting of the mirror may be accomplished by adjusting the screw 43$^a$ irrespective of the lateral or inclined position of the mirror.

In the operation of the light above described, the lines $a$ represent elements of the cone or pencil of light issuing from the reflector 16. One of the elements $a$ is also designated A for use as a reference ray, it being one of the elements along the outside of the cone or pencil of light. In the present instance, the pencil of light $a$ is shown directly and truly focused on the mirror 12 in the vicinity of the point 14, (Figs. 1 and 4). Each of the light elements $a$ is reflected from the mirror 12 and the reflected rays are designated $a'$, the reference element A being specially designated A'. Since the foci of the reflector 16 and the lens 11 are substantially superimposed on the mirror 12, the beam issuing from the lens is composed of parallel rays $a''$ and A'' which are parallel to the principal axis 13 of the lens 11.

It will be observed that even though the light elements $a$ are truly focused on point 14 on the mirror, there will be other rays issuing directly from the lamp 15 which will not be so focused thereon. These are designated by the dotted lines $b$ and B which represent the light elements including only those direct rays from the bulb 15 which are incident on the mirror 12. These elements are shown reflected from the mirror 12 by the lines $b'$ and B'. It will be observed that a portion of these direct rays $b$ which are incident on the mirror are lost as well as all of those direct rays from the bulb which are not incident on the mirror and the reflector. Of course, it is within contemplation of the invention that other mirrors can be located within the casing to collect these rays and to project them from the lens in the desired direction.

The directions of the rays $b'$ and B' are such as would be taken by rays emitted directly from a light source located on the principal axis 13 of the lens but to the rear of the true principal focus 14. Consequently, the rays $b''$ B'' projected by the lens 11 will converge toward the front and will be focused at some point forward of the headlight. It will be apparent that the lines $b'$ B' if extended rearwardly to a point behind the mirror will meet at a point which is a virtual image of the light source and that the location of this image will be one of two conjugate foci, the front one of which is the point in advance of the car at which these rays are focused. Because the mirror 12 is located substantially above the principal axis 13 of the lens, the effect of the direct rays from the lamp will not be observed above the level of the lens 11.

In practice, as is well known, the elements of light from a lamp and a reflector consist of primary reflected beams herein called $a$ and the direct rays herein called $b$, with which are mixed a quantity of aberrant rays. Such aberrant rays are scattered at all angles and are more or less concentrated about a focal point. But one such aberrant ray is herein indicated and is designated as $c$ merely for the purpose of explanation, its source not being particularly indicated. The aberrant ray $c$ is reflected by the mirror 12 along the path $c'$ and is projected downwardly by the lens along the path $c''$. Of course, all other projected aberrant rays will follow a similar path and since none can approach the lens in an upward direction and at the same time cross the principal axis inside the principal focus, there will be none upwardly projected by the lens. In the above description the majority of the effective rays $a$ are described as truly focused at a point. This, however, is not a practical requirement and is even undesirable since it would, under some conditions, result in a parallel rod of light the size of the lens. Some spreading of the rays is desired and this is effected by distorting the focus or by adjusting the mirror, or both, so as to secure a large number of aberrant rays in the vicinity of the theoretical focus 14. In Fig. 4, the mirror is shown with a circle 44 about the theoretical focus 14 which circle is made a target for the primary rays $a$ and those aberrant rays $c$ which are but slightly distorted from the path of the theoretical primary rays $a$. Thus the target 44 is like a crater through which issues by reflection a cone or pencil of light which is projected axially by the lens 11 with slight spreading. The bottom edges 34 and 35 of the mirror serve to cut off all those aberrant rays which would become upwardly directed were the mirror extended greatly below the principal axis of the lens, while the part of the mirror above the principal axis being illuminated by the direct rays $b$ and certain of the aberrant rays $c$ is projected downwardly and forwardly. Thus the lower edges form a sharp cut-off between light and darkness ahead of the lens.

Adjusting the bulb 15 with relation to the reflector 16 will change the character of the crater of light on the mirror enabling one to move it upwardly or downwardly with respect to the true focus 14. The universal mounting of the bulb will serve to do this while the axial adjustment will serve to spread or concentrate the rays with relation to the focal point. Upward movement of the crater on the mirror will throw the projected rays downwardly at a greater angle while downward shifting of the crater on the mirror will raise the rays toward upward projection. However, the rays as they begin to be upwardly projected will be cut off by the edge of the mirror.

Adjusting the mirror also has its peculiar advantages. In Fig. 1 the focal point has been described theoretically as lying in the reflecting surface. The angle of the mirror is such that the rays are projected by the lens parallel to the principal axis just as if the light source were located at the true focal point 14 on the principal axis. However, by inclining the mirror towards the horizontal about the point 14 as a pivot point, the cone of light designated by the lines $a'$ and $A'$ will be lowered so that only a portion of it will be incident on the mirror. At the same time, the image of the bulb from which the rays $b'$ and $B'$ appear to issue will be raised above the principal axis and its projected light $b''$ $B''$ will be further lowered from the position shown in Fig. 1. In the same manner an incline of the mirror 12 towards the vertical from the position shown in Fig. 1, similarly about the focus 14, will raise the cone of light $a'$ $A'$ so that a less portion thereof will be projected, its parallel projection, however, being unchanged. In this case the image of the lamp 15 will be lowered below the principal axis and its rays $b'$ $B'$ will be projected somewhat upwardly when this adjustment is desired. In the same manner, it is to be understood that an incline of the mirror about a vertical axis through point 14 will move the virtual image of the bulb 15 to the right or to the left of the principal axis, in which case it will function to the left or to the right respectively of the principal axis in advance of the headlight.

In addition to the incline of the mirror it may be horizontally moved by the adjusting screws 42. Taking the mirror as inclined in Fig. 1, assume it to be rearwardly moved to the position indicated at 12$^a$, the rearward motion in this instance is greatly exaggerated in its distance even to the extent of bringing the mirror beyond the casing 10, better to illustrate the effect, and to avoid complicating the drawings with closely compact lines. In the new position 12$^a$ of the mirror, the rays $a$ and $A$ will not be intercepted until they are incident on the mirror 12$^a$ when they will be reflected as shown by the lines $a^a$ and $A^a$ which when extended will form the virtual focus 14$^a$. Thus by rearwardly moving the mirror the virtual source of light can be rearwardly moved beyond the true focus of the lens 11. The lens will thus project the image 14$^a$ of the source of light as convergent rays rather than as parallel rays. Since the point 14$^a$ is shown above the principal axis, caused by moving the inclined mirror rearwardly, it may be lowered thereto if desired by inclining the mirror, as above described, to compensate for the displacement. In a like manner, the mirror 12 may be moved forward of its position in Fig. 1 and the virtual source 14$^a$ will then be placed in front of the principal focus 14 of the lens. The lens will then project the rays slightly flaring instead of truly parallel which, of course, is the most desirable condition. On so placing the virtual source 14$^a$ forwardly it will be brought below the principal axis 13, thus tending to direct the rays upwardly. By inclining the mirror as above described, it may be brought to or above the principal axis to compensate for the initial displacement. Thus a variety of combinations may be made by adjusting the mirror angle or its horizontal location or by adjusting the bulb with reference to its reflector.

The vertical adjustment permits the raising or lowering of the edge of the mirror. As a rule automobile lamps are fixedly mounted upon the body or frame of the car. By providing the vertical adjustment for the mirror the cut-off edge thereof may be shifted with respect to the axis of the lens in order to effect the desired angular projection of the light and dark boundary with respect to the car irrespective of the vertical angular relation of the lamp and the car body or frame.

Because commercial lenses made by quantity production may not be exact duplicates of each other, and may vary slightly in focal length, the various adjustments herein provided permit adaptation of the light to variations in lenses. The horizontal adjustment is therefore particularly useful for accommodating the parts to lenses of varying focal length.

The construction of the headlight is not, of course, limited to the form shown in Fig. 1, various other embodiments of the invention being possible, some of which are shown in the remaining figures. Complete details of construction are not, however, repeated, the sketches being more or less diagrammatic. Fig. 2 illustrates a light in which a casing 45 has a lens 46, a lamp 47, and a reflector 48 located at the top and directed downwardly onto a mirror 49 similar to the mirror 12. A second mirror 50 is interposed between the focal mirror and the lens 46 in order to permit the use of a lens having a greater focal length than is shown in Fig. 1 and yet to maintain a compact relation of the parts in a substantially spherical casing.

It will be observed that the focal length of the lens 46 is greater than the inside dimension of the casing along the principal axis of the lens. But the interposition of the mirror 50 in effect reflects the principal focus to a point inside the casing so that the rays approach the lens, reflected by the mirror 50, as if issuing from the true principal focus at the rear of the mirror 50. The advantages of this construction lie in the fact that the lens of greater focal length is cheaper and better suited for the purpose of the invention. The reflector 48 is downwardly inclined and cannot collect dust and particles of dirt so readily as the reflector of Fig. 1. In the present case the mirrors 49 and 50 may be made adjustable to effect a greater degree of flexibility in using the light.

Referring to the adjustability of the mirror 50, it will be recalled that in the discussion of Fig. 1, it was shown that the incline of the mirror moves the cone a' A' so that only a portion of it is directed towards the lens 11. It will be readily seen that by interposing a second mirror such as the mirror 50, in the device of Fig. 2, would permit an adjustment to redirect the cone and project the maximum amount of light. This adds to the variety of adjustments which are possible and increases the efficiency of the light without impairing any of its advantages.

A further modification of construction is also shown in Fig. 2 wherein the reflector 48 is provided with a universal socket 51 similar to the socket 26, but located inside the reflector rather than outside.

Still another type of headlight is shown in Fig. 6 which combines some of the features of Figs. 1 and 3. The casing 52 is provided with a long focus lens 53 placed above a reflector 54, carrying a bulb 55. The reflector is positioned to focus horizontally onto the mirror 56, resembling mirror 12 of Fig. 1. A second mirror 57 is positioned to reflect the light from mirror 56 to the lens, the reflected focus of lens 53 being arranged to coincide substantially with the focus 58 of the reflector 54. It is, of course, understood that the mirrors 56 and 57 are adjustable in any desired manner, as for example that described in Fig. 1 to produce the desired variations of the projected beam.

In Fig. 6, the reflector 54 has a universal socket 59 part of which is located within and part without the cavity of the reflector.

The principles of the invention as described by reference to Fig. 1 apply equally well to Figs. 2 and 6, the additional mirror giving greater range of adjustment besides other advantages as will be clear from the foregoing discussions.

It will be understood that the invention is capable of a large number of variations to effect the desired result and that it is not wholly limited to the use of plane mirrors, nor to focusing reflectors, nor to direct focusing of the rays a upon the first mirror upon which they are incident. To one skilled in the art it will be obvious that other constructions are possible differing considerably from those herein discussed, which can be made to embody the broad principles of the invention as outlined in the appended claims.

In the appended claims I use the term "principal focus" in reference to the lens, but in so doing I do not confine the meaning to locating the principal focus on the principal axis of the lens, since it is clear in view of the foregoing description that the interposition of a mirror between the lens and the true principal focus, which lies in the principal axis, will serve to move the principal focus to a different position without in any way changing its character as a principal focus for the purpose of the present invention.

I claim as my invention:

1. A light projector comprising, in combination, a source of light, a lens, a mirror, said lens having its principal focus substantially on the mirror, and means to focus light from said source onto the surface of the mirror for reflection to said lens, said mirror having an edge adjacent the focal point of the light thereon.

2. A light projector comprising a source of light, a mirror, means to focus light from said source substantially onto the surface of the mirror, and a projecting system, said mirror and said system being so arranged with respect to each other that the focused light incident on said mirror approaches the projecting system as from the immediate vicinity of the principal focus of said projecting system, the edge of the mirror surface being located adjacent the focal spot.

3. A headlight comprising in combination, a casing, a lens, a source of light, a light-focusing means, and a mirror, all in said casing, said mirror and lens being arranged to have the principal focus of the lens substantially in the surface of the mirror adjacent an edge thereof, said focusing means being adapted to focus the light from said source substantially onto the surface of the mirror in the immediate vicinity of said principal focus, whereby certain aberrant rays pass by the edge of the mirror, said mirror being further adapted to reflect said focused light toward the lens, and means to vary the position of the mirror to vary the projection of the illuminated edge.

4. A headlight comprising, in combination, a casing, a lens, a source of light, a light-focusing means, and a mirror, all in said casing, said mirror and lens being arranged to have the principal focus of the lens lie substantially in the surface of the mirror, said focusing means being adapted to focus the light from said source substantially onto the surface of the mirror in the immediate vicinity of said principal focus, said mirror being further adapted to reflect said focused light toward the lens, and means to move the mirror along the principal axis of the lens.

5. A headlight comprising in combination, a casing, a lens, a source of light, a light-focusing means, and a mirror, all in said casing, said mirror and lens being arranged to have the principal focus of the lens substantially in the surface of the mirror adjacent an edge thereof, said focusing means being adapted to focus the light from said source substantially onto the surface of the mirror in the immediate vicinity of said principal focus, whereby certain aberrant rays pass by the edge of the mirror, said mirror being further adapted to reflect said focused light toward the lens, and means to incline the mirror at varying angles.

6. A headlight comprising in combination, a casing, a lens, a source of light, a light-focusing means, and a mirror, all in said casing, said mirror and lens being arranged to have the principal focus of the lens substantially in the surface of the mirror, said focusing means being adapted to focus the light from said source substantially onto the surface of the mirror in the immediate vicinity of said principal focus, said mirror being further adapted to reflect said focused light toward the lens, and means to move the mirror universally.

7. A headlight comprising in combination, a casing, a lens, a source of light, a light-focusing means, and a mirror, all in said casing, said mirror and lens being arranged to have the principal focus of the lens substantially in the surface of the mirror, said focusing means being adapted to focus the light from said source substantially onto the surface of the mirror in the immediate vicinity of said principal focus, said mirror being further adapted to reflect said focused light toward the lens, means to vary the focus of the light on the mirror, and means to move the mirror universally.

8. A headlight comprising in combination, a casing, a lens, a lamp and reflector, and a mirror, all in said casing, said reflector being arranged to focus light from the lamp to a small area in the vicinity of a point on the surface of the mirror, said mirror being arranged to reflect said light toward the lens, said lens being located to have its principal focus substantially coincident with said point on the mirror, said mirror having an edge of its reflecting surface substantially at the principal focus, other portions of the surface of said mirror being adapted to reflect other light from said source and from said reflector to said lens substantially all on one side of the principal axis of the lens.

9. A headlight comprising in combination, a casing, a lens, a lamp and reflector, and a mirror, all in said casing, said reflector being arranged to focus light from the lamp to a small area in the vicinity of a point on the surface of the mirror, said mirror being arranged to reflect said light toward the lens, said lens being located to have its principal focus substantially coincident with said point on the mirror, said mirror being so formed and located as to lie substantially all on one side of the principal focus of the lens whereby to reflect other light incident thereon from the lamp and the reflector toward the lens of one side only at the principal axis of the lens.

10. In a headlight, in combination, a projecting system, a mirror positioned substantially in the focal plane of said system, said mirror having a V-shaped edge with the apex of the V substantially at the principal focus of the system, means to illuminate the mirror generally, and means to focus a beam of light on the mirror substantially at the apex of the V.

In testimony whereof, I have hereunto affixed my signature.

PAUL FRANCIS PFEIL.

CERTIFICATE OF CORRECTION.

Patent No. 1,645,721.  Granted October 18, 1927, to

PAUL FRANCIS PFEIL.

It is hereby certified that error appears in the printed specification of the above numbered patent requiring correction as follows: Page 6, line 100, claim 9, for the word "of" read "at", and line 101, for the word "at" read "of"; and that the said Letters Patent should be read with these corrections therein that the same may conform to the record of the case in the Patent Office.

Signed and sealed this 3rd day of January, A. D. 1928.

Seal.

M. J. Moore,
Acting Commissioner of Patents.